June 2, 1964 H. C. HANSEN 3,135,516

PHONOGRAPHS

Filed April 26, 1960 4 Sheets-Sheet 1

FIG. I

INVENTOR.
HANS CHRISTIAN HANSEN.
BY Dicke, Craig & Freudenberg
ATTORNEYS

June 2, 1964 H. C. HANSEN 3,135,516

PHONOGRAPHS

Filed April 26, 1960 4 Sheets-Sheet 2

INVENTOR.
HANS CHRISTIAN HANSEN.

BY Dicke, Craig + Freudenberg
ATTORNEYS

June 2, 1964 H. C. HANSEN 3,135,516

PHONOGRAPHS

Filed April 26, 1960

4 Sheets-Sheet 3

INVENTOR.
HANS CHRISTIAN HANSEN.

BY
Dicke, Craig & Freudenberg
ATTORNEYS

June 2, 1964

H. C. HANSEN 3,135,516

PHONOGRAPHS

Filed April 26, 1960

4 Sheets-Sheet 4

INVENTOR.
HANS CHRISTIAN HANSEN.
BY
Dicke, Craig & Freudenberg
ATTORNEYS 3,135,516
PHONOGRAPHS
Hans C. Hansen, 14 Christiansholmsvej, Copenhagen, Denmark
Filed Apr. 26, 1960, Ser. No. 24,805
Claims priority, application Great Britain May 5, 1959
9 Claims. (Cl. 274—9)

The present invention relates to phonographs and has as its main object to provide a phonograph structure which does not require a rigid chassis or unit plate.

It is a further object of the invention to provide a phonograph having its heaviest parts mounted as a unit on a rigid structure.

It is a further object of the invention to provide a unitary supporting structure for a phonograph whereby the necessity of having a steel unit plate of substantial rigidity can be avoided.

It is a further object of the invention to provide a lightweight portable phonograph structure.

Still a further object of the invention is to provide a phonograph having a simplified trigger mechanism.

Still a further object of the invention is to provide a trigger mechanism for a phonograph which is simple in design and easy to mount.

With these and further objects in mind which will appear from the following description the invention will now be described with reference to the accompanying drawing in which——

Figure 1:
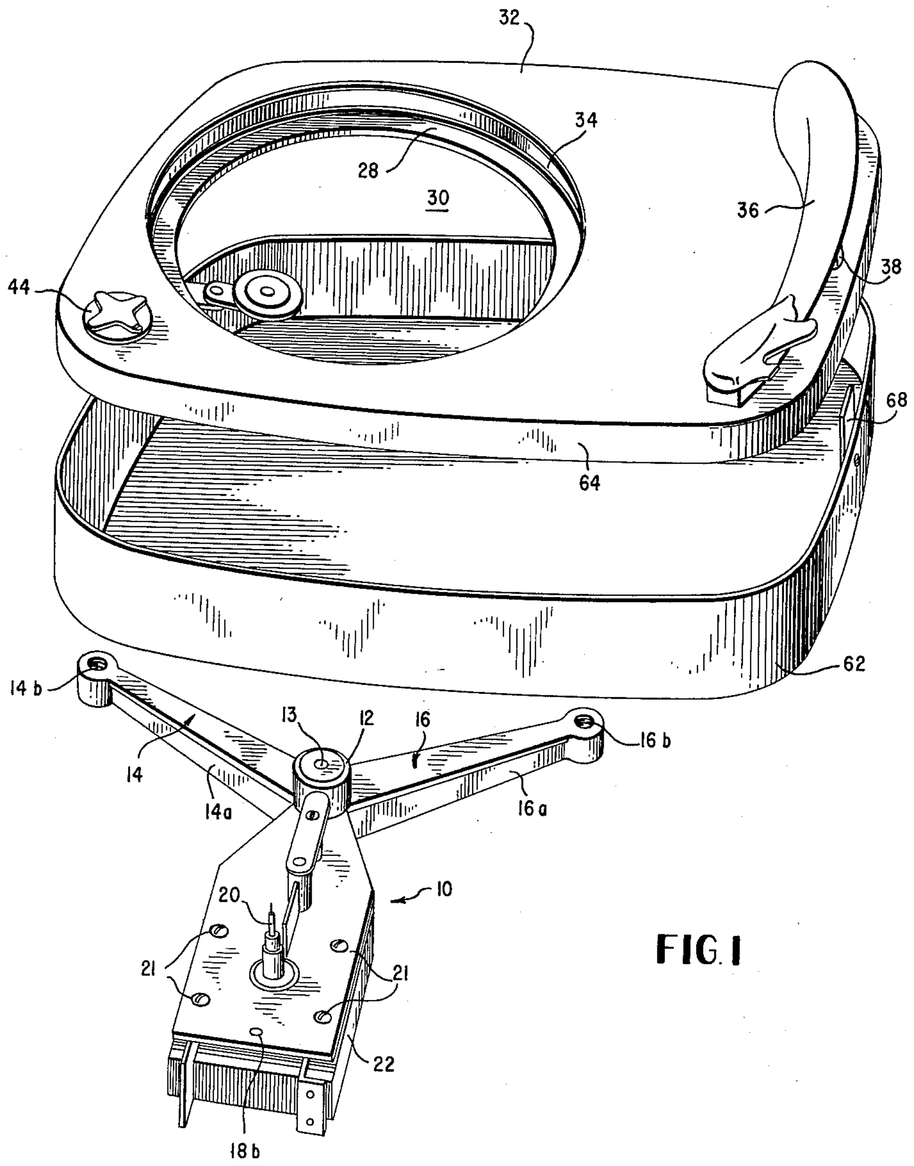
Figure 2:
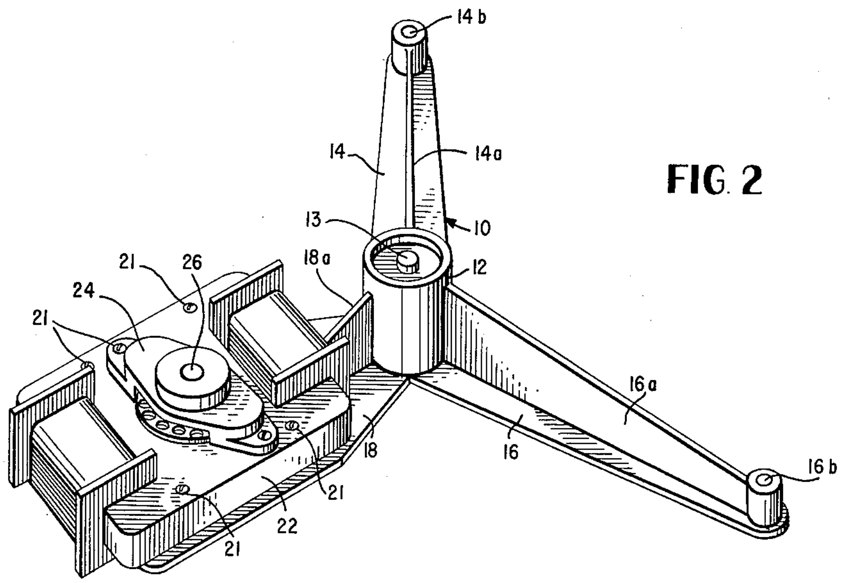
Figures 3, 4:
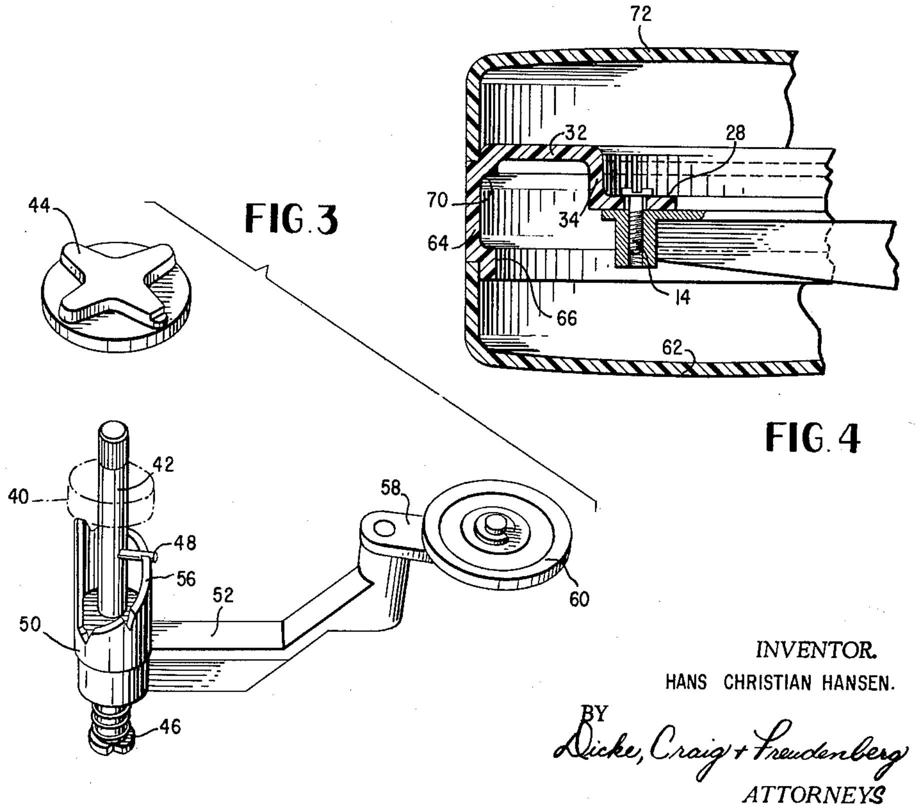
Figure 5:
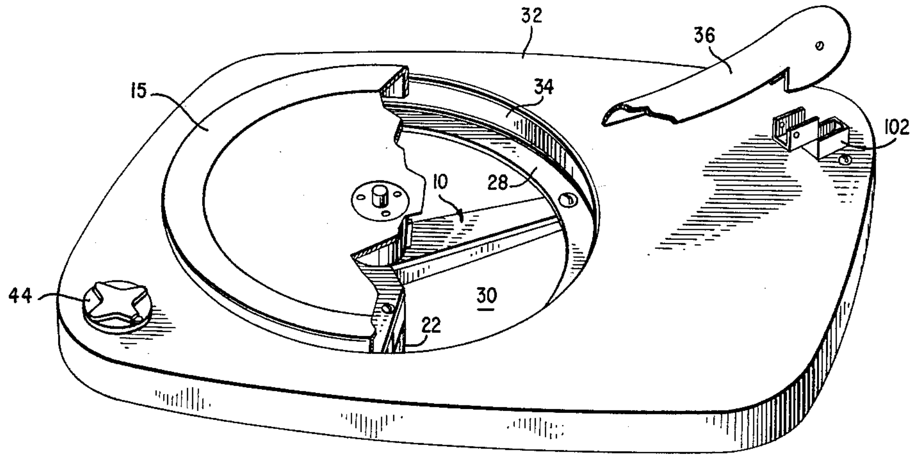
Figure 6:
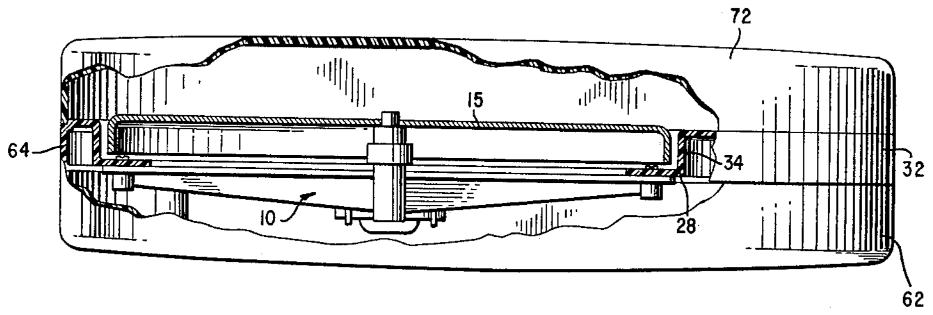
Figure 7:
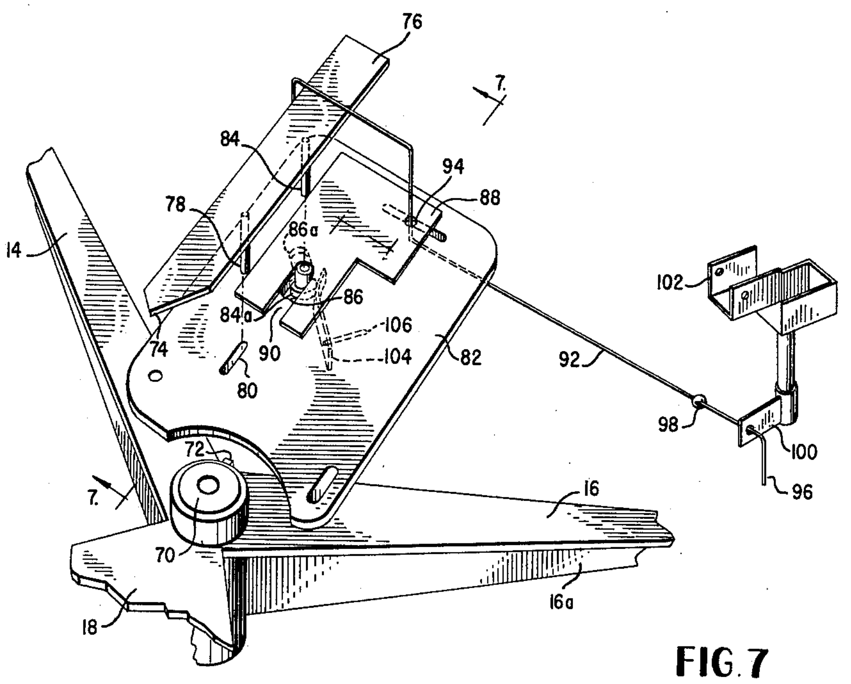
Figure 7A:
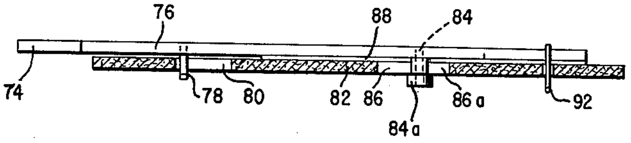

FIGURE 1 is a perspective exploded view of the essential parts of a portable phonograph according to the invention, FIGURE 2 is a perspective view of the unitary structure seen from the bottom, FIGURE 3 is a perspective view of the turntable speed change mechanism, FIGURE 4 is a section through a part of the phonograph according to the invention, FIGURE 5 is a perspective view of a phonograph assembly including turntable assembled from the parts shown in FIGURE 1, FIGURE 6 is a vertical section through the phonograph assembly shown in FIGURE 5, FIGURE 7 is a perspective view of a trigger mechanism for providing automatic stop of the phonograph, and FIG. 7*a* is a cross sectional view taken along line 7—7 of FIGURE 7.

The phonograph illustrated comprises a unitary structure generally designated by reference numeral 10, which as illustrated in FIGURE 2 is in the form of a rigid structure having a central portion 12 including a bearing 13 for receiving and supporting the phonograph turntable 15, see FIGURES 5 and 6, and a plurality of radially extending arms 14, 16 and 18. The arm 18 is formed like a plate and provides a support for the phonograph motor, the shaft of which with its stepped end 20 (FIGURE 1) extends above the top side of the arm 18.

The top bearing for the motor shaft is in some suitable manner supported on the underside of the arm 18 or embedded in a hole in the arm. In the arm 18 a plurality of holes are provided for receiving screws or bolts 21 extending through the motor stator lamination 22 and hold the stator together. Furthermore two of these screws or bolts extend as shown in FIGURE 2 through a bridge member 24 on which the bottom bearing 26 for the motor shaft is supported. As will be understood the arm 18 can be designed to constitute part of the motor structure, and the entire structure 10 is a rigid structure comprising the phonograph motor and the turntable bearing.

The structure 10 may be made by moulding or diecasting from any suitable rigid material such as a metal alloy, preferably of a non-magnetizable material.

To provide for sufficient rigidity the arms are provided with stiffening ribs 14*a*, 16*a* and 18*a* or the like as shown in FIGURE 2.

Adjacent the exterior end of each of the arms 14, 16 and 18 a hole 14*b*, 16*b* and 18*b* (FIG. 1) respectively is provided for receiving screws or the like, whereby the entire rigid structure can be mounted on an inwardly directed flange 28 in an aperture 30 of a mounting board 32 in such a manner that the turntable 15, when received in the bearing 13 in the middle of the portion 12 will be concentric with an aperture 30 of the board 32 having a downwardly depending wall 34 from the lower end of which the inwardly directed flange 28 extends.

Since all the heavy parts of the phonograph are supported in the unitary structure 10, only the remaining lightweight parts of the phonograph will have to be carried by the board 32. Accordingly the board may be constructed from a relatively thin material. As a suitable material for the board thin steel plate or wood can be used, but I prefer to make the board moulded in a suitable plastic such as polyvinylchloride.

The lightweight parts of the phonograph to be supported on the unit plate are the speed selector gear mechanism and the tone arm. The tone arm is referred to by 36 and is designed to rest on a post 38 including an actuating member for the motor switch (not shown) which is also secured to the unit plate.

The tone arm structure may in any suitable manner by means of a pair of screws or the like be secured to the unit plate.

The speed selector gear is shown in FIGURE 3 and includes a bushing 40 which may be firmly secured to the unit plate in the mould. A control shaft 42 having a speed selector knob 44 at its top end extends down through the bushing 40 and carries at its lower end a disc or the like 46. A pin 48 is secured to the shaft 42 and extends in radial direction. A sleeve 50 forming a unitary member with a radially extending arm 52 surrounds the shaft 42. Between the lower end of the sleeve 50 and the top of the disc 46 a spring 54 is interposed pressing the sleeve upwards to engage an upwardly facing cam surface 56 of the sleeve 50 with the pin 48. This cam surface 56 comprises a plurality of portions extending helically around a part of the periphery of the shaft 42. Between the helical portions notches or the like are provided so that when the shaft is rotated in counter-clockwise direction the engagement between the pin 48 and each of the helical portions will cause the structure 50, 52 to be pressed downwards. The arm 52 will be arrested in different horizontal planes when the pin engages in different notches between each of the helical cam portions. On the end of the arm 52 an arm 58 is swingingly arranged and carries a rotatable driving roller 60 for engagement between the stepped end 20 of the motor shaft and the flange of the turntable.

It will be understood that each of the notches of the cam 56 corresponds to the position of the driving roller 60 in engagement with a selected one of the steps of the motor shaft 20. A spring (not shown) is interposed between the arm 60 and a point of the arm 18, and suitable abutment means (not shown) will limit swinging of the arm 52.

It will be appreciated that when the control shaft 42 is turned so as to move the structure 50, 52 downwardly the engagement with the helical cam surfaces 56 will cause the arm 52 to swing clockwise until a stop (not shown) limits the swinging movement. Hereby the driving roller 60 is disengaged from the motor shaft when moved down to be shifted from engagement with a stop having a smaller diameter to a stop having a larger diameter. It will be understood that the structure and mode of operation of the speed selector arrangement are substantially as described in my U.S. Patent No. 2,891,409.

In order to provide for automatic stop of the phonograph in response to passage of the stylus member through the outlet groove of a record supported on the turntable a trigger mechanism is mounted on a plate 82 (FIGURE 7) between the two arms 14 and 16 of the spider. The trigger mechanism is in traditional manner operated from a rotating nose 72 on the turntable spindle 70. The nose 72 is designed to engage the front end 74 of a trigger lever 76 so as to thereby reciprocate the lever. The lever 76 is guided by means of a pin 78 extending below the lever through a slot 80 (FIGURE 7*a*) in the base plate 82. Spaced from the pin 78 a further pin 84 is secured to and extends below the lever 76. The pin 84 is guided in an aperture 86 in the plate 82. The aperture 86 has adjacent the end remote from the spindle 70 a sidewardly directed extension **86*a* capable of receiving the pin 84 when the lever 76 is reciprocated so as to thereby latch the lever 76 in its pushed back position. Between the downwardly facing surface of the lever 76 and the plate 82 a piece of thin plate or foil 88 is interposed. This may be a piece of suitable plastic foil or a foil of metal or any other convenient material. The foil 88 has adjacent its front end a slot 90 to provide passage for the pin 84. The foil 88 constitutes a second lever of the trigger mechanism, i.e. the lever to be moved in response to inward swinging of the tone arm 36. To control the movement of the foil piece 88 a piece of wire 92 is bent in the form illustrated and passes from the underside of the foil through a hole 94 passing over the top side of the lever 76 with a downwardly bent end at the rear edge of the lever 76 remote from the hole 94. The right hand end of the wire 92 is bent at 96 and has an abutment 98 to be engaged by an arm 100 which forms a unitary part of the tone arm supporting structure on the top bracket 102** of which the tone arm is supported.

The lower end of the pin 84 has below the plate 82 a head **84*a* in engagement with which there is provided a leaf spring 104 secured in some convenient manner below the plate 82 and extending in a direction so as to urge the pin 84 into the sidewardly directed extension 86*a* of the slot 86 when the lever 76** is reciprocated to its rear position.

The spring 104 may be one part of the phonograph motor switch, the other part of which is a stationary switch member 106 also supported on the plate 72 in such a position that the switch is closed when the spring 104 is bent into engagement with the stationary switch member 106 under influence of the pin 84 in the front position of the lever 76.

It is supposed that start of the phonograph takes place in the usual manner by lifting the pick-up arm by hand and swinging it slightly outwards. Thereby the arm 100 of the tone arm assembly will engage the bent end 96 of the wire member 92 which will cause the entire trigger structure including the foil member 88 and the lever 76 to swing about the pin 78. This will unlatch the pin 84 from the extension **86*a* of the slot 86, and due to the location of the leaf spring 104 and the direction in which it urges the pin 84** the entire trigger structure will be reciprocated to its front position, i.e. the operative position, and the switch will be closed.

During the playing of the last part of a record the arm or lever 100 will engage the abutment 98 of the wire member 92, and due to the engagement of the wire member 92 with the foil plate 88 this will cause the foil plate to swing slightly counterclockwise about the pin 84. The lever 76 will participate in this swinging movement, but as long as the phonograph stylus follows the sound groove of the record the swinging movement of the lever 76 will not be sufficient to enable the abutment 72 to engage the front end 74 of the lever 76 to reciprocate the lever. The lever 76 will, however, as usual in this type of trigger mechanisms be pushed slightly back each time the rotating nose or abutment 72 passes the front end. Such relative swinging between the lever 76 and the foil 88 is allowable against the friction between these parts.

When the stylus passes through the outlet groove of the record after playing thereof the abutment 72 will reciprocate the lever 76, whereby the pin 84 will be pushed into the extension **86*a* of the slot 86 under influence of the spring 104, whereby the lever 76** is latched in its rear position and simultaneously the switch is opened.

It will be appreciated that this trigger structure is of extreme simplicity. The mounting base for the trigger, i.e. the plate 72, may as the foil 88 be of a synthetic resinous material and also the lever 76 may be of such synthetic resinous material for example a linear polyamide (nylon).

It will furthermore be appreciated that my invention provides for the structure of a simplified lightweight portable phonograph. For this purpose I provide the periphery of the unit plate 32 with means capable of receiving and being connected with the top edge of a box 62. More specifically, as shown in FIGURES 4 and 6, the periphery of the unit plate 32 is provided with a downwardly extending flange 64. The lower end of this flange may at 66 be folded to define a groove or rabbet, to receive the top edge of the side of the box 62 or alternatively as shown in FIGURE 1 guide pieces 68 may at suitable spaced points along the periphery of the side wall of the box be adapted to engage the interior surface of the flange 64. Preferably also the box 20 is moulded of a suitable plastic. The junction between the flange 64 and the horizontal part of the unit plate 32 may also be provided with a groove or rabbet for receiving the edge of a cover 72. By suitable designing of these grooves the box and cover may be of precisely the standardized size and configuration.

It will be understood that the unit plate structure can be secured to the box 62 in any suitable manner such as by means of screws or rivets, and that the cover may be provided with suitable snap lock members to engage with projections or the like on the unit plate for detachably holding cover on the phonograph.

It will also be understood that in the case of a portable phonograph a suitable handle will have to be arranged on one of the parts, preferably on the flange 64 of the unit plate.

Though in the foregoing the invention has been described in great detail with reference to a complete embodiment of a simplified phonograph including a simplified trigger mechanism it will be understood that the invention is not limited to the embodiment shown and described and that various modifications may be possible within the scope of the invention.

It will also be understood that the simplified trigger mechanism is not limited to be combined with a phonograph switch as described, and that the simplified trigger mechanism may be used for controlling start of a cam disc which controls the movements of the tone arm during a cycle.

I claim:

1. In a phonograph having a turntable structure provided with engaging means rotating in unison therewith and a tone arm structure provided with stylus means engaging the sound grooves of a record during playing thereof while supported on said turntable structure, a trigger mechanism comprising a relatively fixed support member, a control member having a first operative position and a second inoperative position and adapted to be engaged by said engaging means in the first position of said control member, connecting means including a relatively thin plate member located between said relatively fixed support member and said control member for frictionally and operatively connecting said control member with said tone arm structure, pin-and-slot connecting means longitudinally guiding said control member relatively to said relatively fixed support member in such a manner that upon actuation of said control member by said engaging means during passage of said stylus means in the outlet groove of the record the control member is displaced initially longitudinally and thereupon latched in the second inoperative position thereof by effectively engaging a lateral extension formed in the slot of said pin-and-slot connecting means, and means including spring means for transmitting the control movement of said control member during latching thereof.

2. In a phonograph having a turntable structure provided with engaging means operatively connected therewith and a tone arm structure provided with stylus means engaging the sound grooves of a record during playing thereof while supported on said turntable structure, a control mechanism comprising a relatively fixed support member, a control member frictionally connected with said tone arm structure to be displaced thereby in one direction during playing of a record and adapted to be engaged by said engaging means so as to be swung back by each such engagement during normal playing of the sound grooves of a record, means for guiding said control member relative to said relatively fixed support member in such a manner that upon actuation of said control member by said engaging means during passage of said stylus means in the outlet groove of the record the control member is displaced longitudinally including spring-loaded latch means for latching said control member near the end of such longitudinal displacement, and means for producing a control effect by the latching action of said control member.

3. In a phonograph having a turntable structure provided with engaging means operatively connected therewith and a tone arm structure provided with stylus means engaging the sound grooves of a record during playing thereof while supported on said turntable structure, a trigger mechanism comprising a relatively fixed support member, a control member having a first operative position and a second inoperative position and adapted to be engaged by said engaging means in the first position of said control member, connecting means for frictionally and operatively connecting said control member with said tone arm structure, pin-and-slot connecting means longitudinally guiding said control member relatively to said relatively fixed support member in such a manner that upon actuation of said control member by said engaging means during passage of said stylus means in the outlet groove of the record the control member is displaced initially longitudinally and thereupon latched in the second inoperative position thereof by effectively engaging a lateral extension formed in the slot of said pin-and-slot connecting means, and means including spring means for transmitting the control movement of said control member during latching thereof.

4. In a phonograph having a turntable structure provided with engaging means operatively connected therewith and a tone arm structure provided with stylus means engaging the sound grooves of a record during playing thereof while supported on said turntable structure, a control mechanism comprising switch means, a relatively fixed support member, a control member having an engaging surface and frictionally connected with said tone arm structure to be displaced thereby in one direction during playing of a record and adapted to be engaged by said engaging means so as to be swung back by each such engagement during normal playing of the sound grooves of a record, means for guiding said control member relative to said relatively fixed support member in such a manner that upon actuation of said control member by said engaging means during passage of said stylus means in the outlet groove of the record the control member is displaced longitudinally including latch means for latching said control member near the end of such longitudinal displacement, and means for producing a control effect by the latching action of said control member including a leaf spring abutting against the engaging surface of said control member and effectively transmitting to said switch means the control effect produced by said latching action.

5. In a phonograph having a turntable structure provided with engaging means rotating in unison therewith and a tone arm structure provided with stylus means engaging the sound grooves of a record during playing thereof while supported on said turntable structure, a trigger mechanism comprising a relatively fixed support member, a control member having a first operative position and a second inoperative position and adapted to be engaged by said engaging means in the first position of said control member, connecting means including a relatively thin plate member located between said relatively fixed support member and said control member in frictional engagement with said control member and wire means operatively connecting said plate member with said tone arm structure, pin-and-slot connecting means longitudinally guiding said control member relatively to said relatively fixed support member in such a manner that upon actuation of said control member by said engaging means during passage of said stylus means in the outlet groove of the record the control member is displaced initially longitudinally and thereupon latched in the second inoperative position thereof by effectively engaging a lateral extension formed in the slot of said pin-and-slot connecting means, and means including spring means for transmitting the control movement of said control member during latching thereof.

6. In a phonograph having a turntable structure provided with engaging means rotating in unison therewith and a tone arm structure provided with stylus means engaging the sound grooves of a record during playing thereof while supported on said turntable structure, a trigger mechanism comprising a relatively fixed support member, a control member having a first operative position and a second inoperative position and adapted to be engaged by said engaging means in the first position of said control member, connecting means including a relatively thin plate member located between said relatively fixed support member and said control member in frictional engagement with said control member and wire means operatively connecting said plate member with said tone arm structure, said wire means extending through an aperture in said plate member, pin-and-slot connecting means longitudinally guiding said control member relatively to said relatively fixed support member in such a manner that upon actuation of said control member by said engaging means during passage of said stylus means in the outlet groove of the record the control member is displaced initially longitudinally and thereupon latched in the second inoperative position thereof by effectively engaging a lateral extension formed in the slot of said pin-and-slot connecting means, and means including spring means for transmitting the control movement of said control member during latching thereof.

7. In a phonograph having a turntable structure provided with engaging means rotating in unison therewith and a tone arm structure provided with stylus means engaging the sound grooves of a record during playing thereof while supported on said turntable structure, a trigger mechanism comprising a relatively fixed support member, a control member having a first operative position and a second inoperative position and adapted to be engaged by said engaging means in the first position of said control member, connecting means including a relatively thin plate member located between said relatively fixed support member and said control member in frictional engagement with said control member and wire means operatively connecting said plate member with said tone arm structure, said wire means extending through an aperture in said plate member, and said wire means having a portion extending above said plate member which overlaps with the rear end of said control member and is provided thereat with an abutment adapted to engage the edge portion of said control member to actuate the same, pin-and-slot connecting means longitudinally guiding said control member relatively to said relatively fixed support member in such a manner that upon actuation of said control member by said engaging means during passage of said stylus means in the outlet groove of the record the control member is displaced initially longitudinally and thereupon latched in the second inoperative position thereof by effectively engaging a lateral extension formed in the slot of said pin-and-slot connecting means, and means including spring means for transmitting the control movement of said control member during latching thereof.

8. In a phonograph having a motor with switch means, a turntable structure provided with engaging means rotating in unison therewith and a tone arm structure provided with stylus means engaging the sound grooves of a record during playing thereof while supported on said turntable structure, a control mechanism comprising a relatively fixed support member, a control member frictionally connected with said tone arm structure to be displaced thereby in one direction during playing of a record and adapted to be engaged by said engaging means so as to be swung back by each such engagement during normal playing of the sound grooves of a record, means for guiding said control member relative to said relatively fixed support member in such a manner that upon actuation of said control member by said engaging means during passage of said stylus means in the outlet groove of the record the control member is displaced longitudinally including spring-loaded latch means for latching said control member near the end of such longitudinal displacement, and means for producing a control effect by the latching action of said control member to actuate said switch means.

9. In a phonograph having a turntable structure provided with engaging means operatively connected therewith and a tone arm structure provided with stylus means engaging the sound grooves of a record during playing thereof while supported on said turntable structure, a control mechanism comprising switch means, a relatively fixed support member, a control member having an engaging surface and frictionally connected with said tone arm structure to be displaced thereby in one direction during playing of a record and adapted to be engaged by said engaging means so as to be swung back by each such engagement during normal playing of the sound grooves of a record, pin-and-slot connecting means for guiding said control member relative to said relatively fixed support member in such a manner that upon actuation of said control member by said engaging means during passage of said stylus means in the outlet groove of the record the control member is displaced longitudinally including latch means effectively formed by said pin-and-slot means for latching said control member near the end of such longitudinal displacement, and means for producing a control effect by the latching action of said control member including a leaf spring abutting against the engaging surface of said control member and effectively transmitting to said switch means the control effect produced by said latching action.

References Cited in the file of this patent

UNITED STATES PATENTS 2,552,757 Adler ---------------- May 15, 1951

FOREIGN PATENTS 590,757 Germany ------------- Jan. 10, 1934

967,245 France --------------- Oct. 27, 1950

973,995 France --------------- Feb. 16, 1951